(12) United States Patent
Wang

(10) Patent No.: US 10,119,829 B2
(45) Date of Patent: Nov. 6, 2018

(54) ROUTE PLANNING METHOD AND DEVICE FOR NAVIGATION SYSTEM AND STORAGE MEDIUM

(71) Applicant: ZTE Corporation, Shenzhen, Guangdong (CN)

(72) Inventor: Lixue Wang, Shenzhen (CN)

(73) Assignee: XI'AN ZHONGXING NEW SOFTWARE CO. LTD., Xi'An (CN)

(*) Notice: Subject to any disclaimer, the term of this patent is extended or adjusted under 35 U.S.C. 154(b) by 111 days.

(21) Appl. No.: 15/112,512

(22) PCT Filed: Jan. 19, 2015

(86) PCT No.: PCT/CN2015/071028
§ 371 (c)(1),
(2) Date: Jul. 19, 2016

(87) PCT Pub. No.: WO2015/131681
PCT Pub. Date: Sep. 11, 2015

(65) Prior Publication Data
US 2016/0334237 A1    Nov. 17, 2016

(30) Foreign Application Priority Data

Aug. 22, 2014 (CN) .......................... 2014 1 0419871

(51) Int. Cl.
*G01C 21/36* (2006.01)
*G08G 1/0968* (2006.01)
(Continued)

(52) U.S. Cl.
CPC .......... *G01C 21/362* (2013.01); *G01C 21/30* (2013.01); *G01C 21/3446* (2013.01);
(Continued)

(58) Field of Classification Search
None
See application file for complete search history.

(56) References Cited

U.S. PATENT DOCUMENTS

| 5,295,180 A * | 3/1994 | Vendetti ................... G01S 5/10 |
|---|---|---|
| | | 455/456.2 |
| 6,853,910 B1 | 2/2005 | Oesterling |
| (Continued) | | |

FOREIGN PATENT DOCUMENTS

| CN | 101272590 A | 9/2008 |
|---|---|---|
| CN | 101400104 A | 4/2009 |
| (Continued) | | |

OTHER PUBLICATIONS

Supplementary European Search Report in European application No. 15758250.3, dated Jul. 26, 2017, 8 pgs.
(Continued)

*Primary Examiner* — Jean Paul Cass
(74) *Attorney, Agent, or Firm* — Cooper Legal Group, LLC

(57) ABSTRACT

Disclosed is a route planning method for a navigation system. The method comprises: performing grid processing on an actual geographic space, the grids being cells in a cellular network, acquiring a mobile station cell handover record, and creating a cell adjacency model according to the mobile station cell handover record; making a source and a destination in the actual geographic space correspond to a source grid and a destination grid after the grid processing, and determining a grid-level path from the source grid to the destination grid according to the inter-grid adjacency model; and converting the grid-level path into an actual route from the source to the destination in the actual geographic space. Also disclosed is a route planning device for a navigation system.

6 Claims, 2 Drawing Sheets

(51) Int. Cl.
*H04W 4/02* (2018.01)
*H04W 64/00* (2009.01)
*G01C 21/30* (2006.01)
*H04L 12/26* (2006.01)
*H04L 29/08* (2006.01)
*H04W 4/04* (2009.01)
*H04W 36/00* (2009.01)
*G01C 21/34* (2006.01)
*H04W 4/029* (2018.01)

(52) U.S. Cl.
CPC ..... *G08G 1/0968* (2013.01); *G08G 1/096844* (2013.01); *H04L 43/028* (2013.01); *H04L 43/045* (2013.01); *H04L 67/06* (2013.01); *H04W 4/02* (2013.01); *H04W 4/023* (2013.01); *H04W 4/029* (2018.02); *H04W 4/046* (2013.01); *H04W 36/0088* (2013.01); *H04W 36/0094* (2013.01); *H04W 64/00* (2013.01)

(56) References Cited

U.S. PATENT DOCUMENTS

| | | | | |
|---|---|---|---|---|
| 7,373,152 | B2* | 5/2008 | Oesterling | H04B 17/20 455/404.2 |
| 9,002,634 | B1* | 4/2015 | Kalyanasundaram | H04W 40/18 370/401 |
| 9,565,625 | B1* | 2/2017 | MacNeille | H04W 48/18 |
| 9,740,205 | B2* | 8/2017 | Ross | H04W 4/027 |
| 9,762,339 | B2* | 9/2017 | Williams | H04H 60/41 |
| 2003/0008619 | A1* | 1/2003 | Werner | G01S 19/14 455/67.11 |
| 2005/0156715 | A1* | 7/2005 | Zou | B60R 25/1025 340/426.19 |
| 2006/0183487 | A1* | 8/2006 | Allen | H04W 4/021 455/456.5 |
| 2007/0211676 | A1* | 9/2007 | Sharma | H04W 16/18 370/338 |
| 2008/0183380 | A1* | 7/2008 | Blackwood | G01C 21/26 701/420 |
| 2008/0242315 | A1 | 10/2008 | Ferman | |
| 2011/0081922 | A1 | 4/2011 | Chandra | |
| 2011/0144899 | A1* | 6/2011 | Soelberg | G01C 21/3461 701/532 |
| 2011/0172906 | A1* | 7/2011 | Das | G01C 21/20 701/533 |
| 2012/0115475 | A1 | 5/2012 | Miyake | |
| 2012/0115476 | A1 | 5/2012 | Shin | |
| 2012/0115505 | A1 | 5/2012 | Miyake | |
| 2012/0329482 | A1 | 12/2012 | Chandra | |
| 2013/0325317 | A1* | 12/2013 | Pylappan | G01C 21/26 701/409 |
| 2014/0278070 | A1* | 9/2014 | McGavran | G01C 21/00 701/465 |
| 2014/0278074 | A1* | 9/2014 | Annapureddy | G01C 21/3453 701/468 |
| 2015/0019124 | A1* | 1/2015 | Bandyopadhyay | G01C 17/38 701/410 |
| 2015/0160018 | A1* | 6/2015 | Ameling | G01C 21/206 701/467 |
| 2016/0044129 | A1* | 2/2016 | Bergmann | H04L 67/2847 455/406 |

FOREIGN PATENT DOCUMENTS

| | | |
|---|---|---|
| CN | 101647047 A | 2/2010 |
| CN | 101794516 A | 8/2010 |
| CN | 102521973 A | 6/2012 |
| JP | 2008539427 A | 11/2008 |

OTHER PUBLICATIONS

English Translation of the Written Opinion of the International Search Authority in international application No. PCT/CN2015/071028, dated May 22, 2015, 7 pgs.

International Search Report in international application No. PCT/CN2015/071028, dated May 22, 2015, 5 pgs.

* cited by examiner

ROUTE PLANNING METHOD AND DEVICE FOR NAVIGATION SYSTEM AND STORAGE MEDIUM

TECHNICAL FIELD

The present disclosure relates to the interdisciplinary field of smart transportation, car networking, a Location-Based Service (LBS), and mobile communications, and in particular to a route planning method and device for a navigation system, as well as a non-transitory computer-readable storage medium.

BACKGROUND

Navigation technology keeps developing with development of car networking and mobile communications, and with an increasingly higher requirement on city management. Early route planning is based mostly on a static Geographic Information System (GIS) map, computing a route by dynamic planning or the like, and thus is highly dependent on the map. A process of mapping, cartography, and map releasing often may set some time, such that map information always lags behind an actual situation. In addition, many emergencies may impact actual road traffic, thereby affecting accuracy and effectiveness of a navigated route. A trend to combine a GIS map and actual road condition data has gradually developed in navigation technology.

There are two main sources of existing road condition data, namely road condition data from free Traffic Message Channel (TMC) and commercial road condition data. The road condition data from the TMC are released by a traffic management department, with real-time data mainly coming from tollgate monitoring and police deployment, leading to good real-time performance. However, a TMC system may not be deployed in every region, leading to limited coverage and limited amount of information. The commercial road condition data mainly come from Float Car Data (FCD), with road condition information being collected generally using an on-cab device deployed by a cab company. Constrained by commercial, technical, and historical factors, the commercial road condition data can provide but road condition information on only a few cities, often with a large delay and poor real-time performance.

To sum up, with existing navigation technology, road condition data cover but a small area, with poor real-time performance, failing to meet a stringent navigation demand. With route planning based solely on a GIS map, it is difficult to guarantee the accuracy and effectiveness of a computed navigated route in case of incorrect or outdated map information, often leading to a large deviation from an expected navigation outcome or even giving a wrong route.

SUMMARY

Embodiments herein provide a route planning method and device for a navigation system, as well as a non-transitory computer-readable storage medium, capable of automatically sensing an actual traffic condition in a relevant area and performing real-time route planning while performing accurate effective interactive navigation according to a change in road condition in real time.

A technical solution according to an embodiment herein is implemented as follows.

According to an embodiment herein, a route planning method for a navigation system includes:

dividing an actual geographic space into grids, the grids being cells of a cellular network; acquiring a handover record of inter-cell handovers of mobile stations; and modelling an inter-cell adjacency according to the handover record;

mapping a departure point and a destination point in the actual geographic space respectively to a departure grid and a destination grid; and determining, according to the modelled inter-cell adjacency, a grid-level path from the departure grid to the destination grid; and converting the grid-level path into an actual route from the departure point to the destination point in the actual geographic space.

The method may further include: before the modelling an inter-cell adjacency according to the handover record, filtering the handover record according to a pre-set filtering solution.

The modelling an inter-cell adjacency according to the handover record may include:

extracting trajectories of the mobile stations according to the handover record;

setting a set of all the trajectories within a period of time as a snapshot; and modelling the inter-cell adjacency within the period of time according to the snapshot.

The modelling the inter-cell adjacency within the period of time according to the snapshot may include:

establishing, according to the snapshot, a weighted directed graph, with base stations of all the cells as vertices, inter-cell adjacencies as edges, and with an inter-cell adjacency index as a weight of an edge.

The inter-cell adjacency index may be a probability of transfer between two cells, or a duration needed for transfer between two cells.

The converting the grid-level path into an actual route from the departure point to the destination point in the actual geographic space may include:

converting the grid-level path into an actual route from the departure point to the destination point in a Geographic Information System (GIS) map; and/or converting the grid-level path into an actual route from the departure point to the destination point in a satellite map.

According to an embodiment herein, a route planning device for a navigation system includes a grid modelling module, a grid path finding module, and a path converting module.

The grid modelling module is configured for: dividing an actual geographic space into grids, the grids being cells of a cellular network; acquiring a handover record of inter-cell handovers of mobile stations; and modelling an inter-cell adjacency according to the handover record.

The grid path finding module is configured for: mapping a departure point and a destination point in the actual geographic space respectively to a departure grid and a destination grid; and determining, according to the modelled inter-grid adjacency, a grid-level path from the departure grid to the destination grid.

The path converting module is configured for: converting the grid-level path into an actual route from the departure point to the destination point in the actual geographic space.

The grid modelling module may be further configured for: filtering the handover record according to a pre-set filtering solution.

The grid modelling module may include:

a trajectory extracting sub-module configured for: extracting trajectories of the mobile stations according to the handover record;

a snapshot managing sub-module configured for: setting a set of all the trajectories within a period of time as a snapshot; and a modelling sub-module configured for: modelling the inter-cell adjacency within the period of time according to the snapshot.

The modelling sub-module may be further configured for:

establishing, according to the snapshot, a weighted directed graph, with base stations of all the cells as vertices, inter-cell adjacencies as edges, and with an inter-cell adjacency index as a weight of an edge.

The inter-cell adjacency index may be a probability of transfer between two cells, or a duration needed for transfer between two cells.

The path converting module may include:

a Geographic Information System (GIS) map matching sub-module configured for: converting the grid-level path into an actual route from the departure point to the destination point in a GIS map; and/or a satellite map matching sub-module configured for: converting the grid-level path into an actual route from the departure point to the destination point in a satellite map.

According to an embodiment herein, a non-transitory computer-readable storage medium stores therein computer executable instructions for executing aforementioned route planning method for a navigation system.

With a route planning method and device for a navigation system, as well as a non-transitory computer-readable storage medium according to embodiments herein, an actual geographic space is divided into grids, the grids being cells of a cellular network; a handover record of inter-cell handovers of mobile stations is acquired; and an inter-cell adjacency is modelled according to the handover record; a departure point and a destination point in the actual geographic space are mapped respectively to a departure grid and a destination grid; and a grid-level path from the departure grid to the destination grid is determined according to the modelled inter-cell adjacency; and the grid-level path is converted into an actual route from the departure point to the destination point in the actual geographic space. With embodiments herein, an actual traffic condition in a relevant area may be automatically sensed and real-time route planning and accurate effective interactive navigation may be performed according to a change in road condition in real time.

DETAILED DESCRIPTION

For clearer illustration of an embodiment and a technical solution herein, the technical solution herein will be further elaborated below with reference to drawings and embodiments. Illustrated embodiments are merely some of the embodiments herein, instead of all of the embodiments herein. Any other embodiment obtained by one skilled in the art based on the embodiments herein without creative effort shall fall within the scope of protection of the present disclosure.

Figure 1:
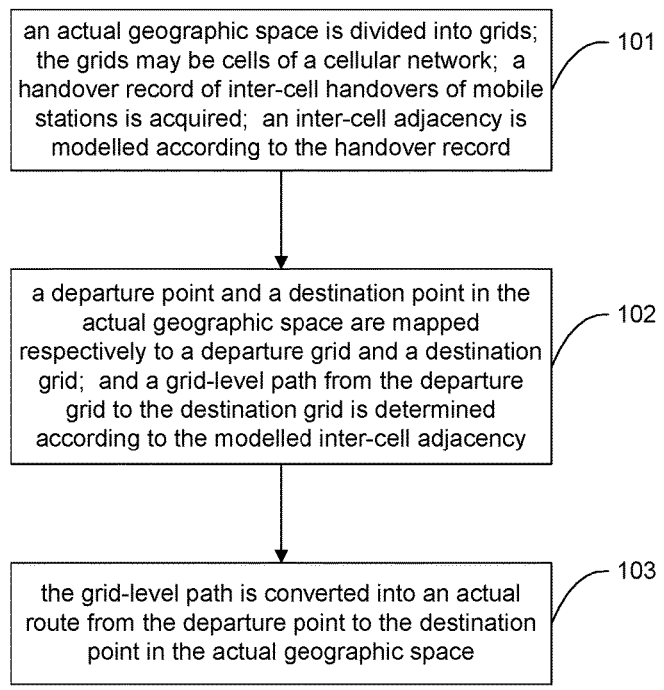
FIG. 1 is a flowchart of a route planning method for a navigation system according to an embodiment herein.

FIG. 1 is a flowchart of a route planning method for a navigation system according to an embodiment herein. As shown in FIG. 1, the method includes steps as follows.

In step 101, an actual geographic space is divided into grids; the grids may be cells of a cellular network; a handover record of inter-cell handovers of mobile stations is acquired; an inter-cell adjacency is modelled according to the handover record.

The navigation system may divide the actual geographic space into grids as follows. The actual geographic space may be divided into multiple areas, each area being one grid. An inter-grid adjacency may then be modelled.

In one embodiment, the navigation system may divide the actual geographic space into grids, taking the cells of the cellular network as the grids, and model the inter-cell adjacency. A cell herein may be space covered by an antenna of a base station.

In a cellular network, mobility management signalling may serve for subscriber location management in the cellular network, and may provide rich information on trajectories of mobile stations. A handover record may be acquired once a cell-level displacement of a mobile station is observed at a base station side, such that the information on a trajectory of an object moving with the mobile station between the grids may be obtained.

a signalling collecting platform of a mobile operator may collect the handover record from a base station controller via an Abis/Iub interface. A handover record may be in a form as: <mobile station number, cell identifier, timestamp of entering cell>. All handover records collected within a period of time may be stored as a file in a storage space. A duration of the period of time may be set, according to processing capacity of the signalling collecting platform, to be say 15 minutes in general. The storage space may be a storage space in a dedicated File Transfer Protocol (FTP) server.

In addition, as mobile smart terminals and mobile internet applications get popular, in particular with wide spread of cab calling software in cab industry, a mobile operator may also acquire a handover record of an inter-cell handover of a mobile station, in particular an on-cab mobile station, by using an internet browsing record of the mobile station. The signalling collecting platform of the mobile operator may extract the handover record in form of <mobile station identifier, cell identifier, timestamp of entering cell> from a signalling record of a Package Switch (PS) domain, such as from a Call Detail Record CDR generated by Deep Package Inspection (DPI), and store all handover records collected within a period of time as a file in a storage space. A duration of the period of time may be set, according to processing capacity of the signalling collecting platform, to be say 15 minutes in general. The storage space may be a storage space in a dedicated FTP server.

The signalling collecting platform of the mobile operator may provide a database for the navigation system to model the inter-cell adjacency according to the handover record.

The navigation system may model the inter-grid/inter-cell adjacency as follows.

In step A, the handover record of inter-cell handovers of mobile stations may be acquired regularly.

The navigation system may read a file recording inter-cell handovers of mobile stations stored in the dedicated FTP server by the signalling collecting platform of the mobile operator, and acquire the handover records from the read file.

In order to model the inter-cell adjacency efficiently and accurately, the navigation system may filter the handover records according to a pre-set filtering solution.

According to a first filtering solution, the navigation system may filter the records according to numbers of mobile stations.

a record related to a number of a mobile station with no mobility may be deleted. In a practical application, some mobile stations do not have mobility. For example, an camera provided at an intersection with a Subscriber Identity Module (SIM) card has an invariant location. However, a base station will receive information on its location regularly, and the signalling collecting platform of the mobile operator will collect and save records of the camera provided at the intersection. The number of such a mobile station may be obtained in advance, and then the records related to the number are deleted.

In addition, only records related to specific mobile station numbers may be retained. For example, only records related to on-cab mobile stations may be retained. It is known that an on-cab mobile station has higher mobility and covers a wider area than a mobile station of a common subscriber. Numbers of on-cab mobile stations may be acquired in advance, and only records related to on-cab mobile stations may be retained.

According to a second filtering solution, the navigation system may filter the records according to cell identifiers.

In some cases, only a few handover records have been acquired, barely enough to reflect the inter-cell adjacency. In this case, it is necessary to refer to handover records acquired previously, such as those acquired a day before a present day. However, if a base station is newly built by the mobile operator on the present day, records related to an identifier of a cell of the newly-built base station are incompatible with the records the day before, and therefore have to be deleted. In this case, the navigation system has loaded original cell identifiers in a memory according to historical records. When a cell identifier in a handover record is not one of the cell identifiers loaded in the memory, the navigation system will delete the handover record.

According to a third filtering solution, the navigation system may skip a record generated due to cell oscillation.

In some cases, a mobile station may perform an inter-cell handover while staying its original location. This is called cell oscillation. Since the mobile station actually does not move, such a handover record generated by cell oscillation fails to reflect the actual inter-cell adjacency, and thus shall not be considered.

After obtaining a new record R, the navigation system may search for a most recent record O with a mobile station number M identical to that of the R, and determine whether a time interval T between the two records O and R is greater than 30 mins. When the time interval T is less than 30 mins, the navigation system may determine whether a cell identifier in the record R is that of one of two cells on which the mobile station number M recently camped, that are stored in the navigation system. When the cell identifier in the record R is that of either cell on which the mobile station number M recently camped, the record R may be deemed as a record generated by cell oscillation, and therefore may not be considered by the navigation system.

In a practical application, at least one of the filtering solutions may be used.

In step B, an inter-cell adjacency is modelled according to the handover record.

The navigation system may extract trajectories of mobile stations within a period of time according to the handover record acquired regularly. The inter-cell adjacency within the period of time may be modelled according to the trajectories. When one or more of the filtering solutions are pre-set in the navigation system, the navigation system may extract the trajectories of mobile stations from the handover record with improved efficiency.

The navigation system may extract the trajectories of mobile stations according to the handover record as follows.

A cell migration pair may be used in the navigation system to represent a trajectory of a mobile station. A cell migration pair may be noted as <original cell identifier, destination cell identifier, residing duration>. The navigation system may store identifiers of two cells on which a mobile station recently camped, and respective timestamps when the mobile station entered the two cells. For example, the navigation system may store two cell identifiers X1 and X2 on which a mobile station M recently camped, a timestamp tt1 corresponding to X1, and a timestamp tt2 corresponding to X2. The tt2 may be greater than the tt1. That is, a most recent handover record of the mobile station M may be <M, X2, tt2>. The navigation system may read a handover record R=<M, n1, t1> of the mobile station M.

The navigation system may compute a time interval T=t1−tt2 between the record R and the most recent handover record of the mobile station M.

When T≥30 mins, it may be deemed that a trajectory recorded by the record R and a trajectory before the time interval T belong to two independent trajectories. In this case, the navigation system may clear the two stored cell identifiers on which the M recently camped by deleting records corresponding to the cell identifiers X1 and X2, and store the cell identifier n1 and the timestamp t1 in the record R.

When T<30 mins, the navigation system may set a cell migration pair <X2, n1, t1−tt2> as a trajectory of the mobile station M, and updates the cell identifiers of two cells on which the mobile station M recently camped with X2 and n1. The timestamp tt2 may correspond to the cell identifier X2. The timestamp t1 may correspond to the cell identifier n1.

All trajectories of the mobile station M may be obtained by processing all records related to the mobile station M as mentioned above, thereby obtaining the trajectories of all mobile stations.

A set of all trajectories (namely cell migration pairs) within a period of time may be referred to as a snapshot. The period of time may be a snapshot time corresponding to the snapshot. For example, a snapshot with a snapshot time of 15 mins may describe a set of all mobile-station trajectories acquired within 15 mins. The navigation system may maintain multiple historical snapshots and a present snapshot. To improve real-time sensing performance of the navigation system and collect an amount of data sufficient to meet a accuracy requirement of the model, a snapshot time of 15 mins to 1 hour may be appropriate. A snapshot may be stored as a file and/or in a database in memory. Historical snapshots may be stored persistently in a file system. A present snapshot and a historical snapshot of the same day may be stored in the database in memory. The database in memory may include a snapshot index table, including a time attribute, a holiday attribute, and a weather attribute of each snapshot. The time attribute may include a year, a quarter, a month, a week, a day, and a time period. The holiday attribute may indicate whether a day is a weekday, a weekend, a holiday, etc. The weather attribute may include a non-severe weather, a heavy rain, a heavy snow, a freeze, etc.

The navigation system may model the inter-cell adjacency within the period of time according to the snapshot as follows.

A weighted directed graph may be established according to the snapshot, with all the cells as vertices, inter-cell adjacencies as edges, and with an inter-cell adjacency index as a weight of an edge. The inter-cell adjacency index may be a probability of transfer between two cells, or a duration needed for transfer between two cells.

Figure 2:
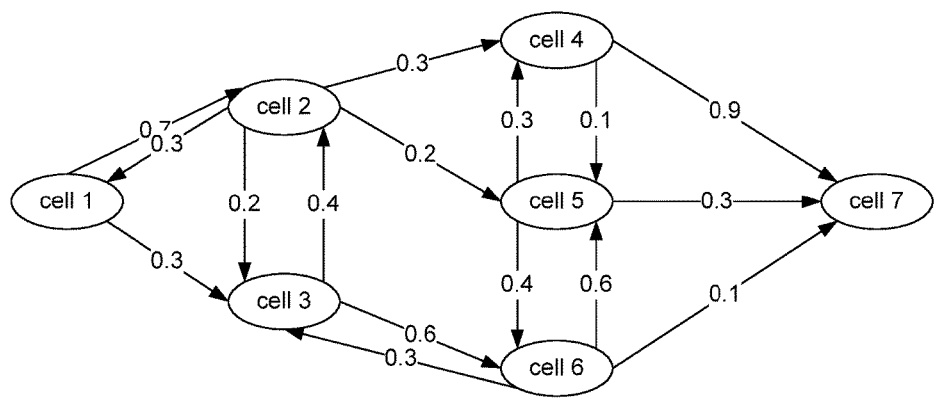
FIG. 2 is a diagram of a directed graph showing a probability of transfer between two base stations according to an embodiment herein.

In a solution I, when a record of a cell migration pair <cell 1, cell 2, residing duration> exists in a snapshot, it means that an edge connects a cell 1 and a cell 2; a probability of transfer from the cell 1 to the cell 2 may be: a number of records of transfer from a source cell 1 to a target cell 2/a number of all records of transfer from the source cell 1. The probability of transfer from the cell 1 to the cell 2 may be set as a weight of an edge pointing from the cell 1 to the cell 2. FIG. 2 is a diagram of a directed graph showing a probability of transfer between two cells according to an embodiment.

Figure 3:
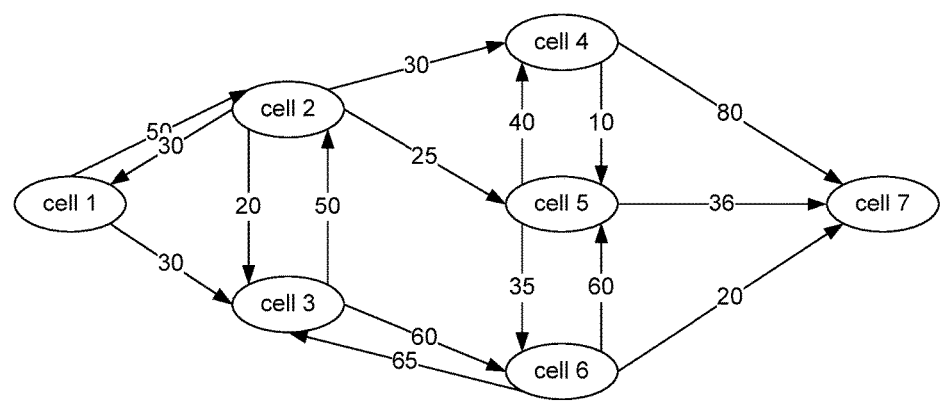
FIG. 3 is a diagram of a directed graph showing a duration needed for transfer between two base stations according to an embodiment herein.

In a solution II, when a record of a cell migration pair <cell 1, cell 2, residing duration> exists in a snapshot, it means that an edge connects a cell 1 and a cell 2; a duration of transfer from the cell 1 to the cell 2 may be an average residing duration over all records <cell 1, cell 2, residing duration>. The duration of transfer from the cell 1 to the cell 2 may be set as a weight of an edge pointing from the cell 1 to the cell 2, and FIG. 3 is a diagram of a directed graph showing a duration needed for transfer between two cells according to an embodiment.

The solution II may be improved by using a higher-order contextual model such as a second-order model. In this case, it is necessary to extract and record a pair <second last cell ID, last cell ID, present cell ID, residing duration> to perform modelling and find a solution using the second-order mode. Implementation using a still higher-order model is possible, so on and so forth.

If trajectories in a present snapshot are too few to model the inter-cell adjacency with accuracy, a historical snapshot may be used together with the present snapshot for constructing the directed graph. However in this case, it has to be ensured that a context state of the historical snapshot matches a present state. Thus, a recent historical snapshot with index characteristics similar to present index characteristics has to be selected.

In step 102, a departure point and a destination point in the actual geographic space are mapped respectively to a departure grid and a destination grid; and a grid-level path from the departure grid to the destination grid is determined according to the modelled inter-grid adjacency.

The navigation system may receive the departure point and the destination point input by a user, map the departure point to the departure grid and the destination point to the destination grid according to a location mapping relation, and determine a grid-level path from the departure grid to the destination grid according to the inter-grid adjacency modelled in step 101.

When the cells of the cellular network may be set as the grids, a base station and/or cell closest to the departure/destination point may be selected as a departure base station/destination cell according to longitudes and latitudes of the departure point, the destination point, and the cells.

The directed graph showing a probability of transfer between two cells may be established according to the solution I. An optimal path from a departure cell to a destination cell may be a most probable path among all paths starting from a node corresponding to the departure cell and ending at a node corresponding to the destination cell. As shown in FIG. 2, an optimal path from a departure cell 1 to a destination cell 7 may be: cell 1→cell 2→cell 4→cell 7 with a generated path probability of 0.7*0.3*0.9=0.189, which is greater than that of any other path, such as a generated probability of a path cell 1→cell 2→cell 5→cell 6→cell 7 0.7*0.2*0.4*0.1=0.0056. The weight of an edge in the directed graph showing a probability of transfer may be modified as −log(original edge weight). Accordingly, optimal path computation may be converted into solving a standard problem of search for a shortest path.

The directed graph showing a duration needed for transfer between two cells may be established according to the solution II. As shown in FIG. 3, solving an optimal path from a departure cell to a destination cell may be converted into searching the directed graph for a shortest path. As shown in FIG. 3, an optimal path from a departure cell 1 to a destination cell 7 may be: cell 1→cell 3→cell 6→cell 7, with a transfer duration of 30+60+20=110, which is less than that of any other path, such as a transfer duration 50+25+36=111 of a path cell 1→cell 2→cell 5→cell 7.

In step 103, the grid-level path is converted into an actual route from the departure point to the destination point in the actual geographic space.

The navigation system may map the grid-level path computed in step 102 onto a GIS map and/or a satellite map to obtain the actual route from the departure point to the destination point.

When the cells of the cellular network may be set as the grids, a cell-level path may be mapped onto a GIS map and be converted into an actual route as follows. The cell-level path may be converted into a polyline in two-dimensional space according to longitudes and latitudes of cells and/or base stations in the cell-level path. The polyline may be smoothed using least squares to obtain a smoothed curve. The curve may be buffered or padded with a distance of 500 meters to obtain an area. All roads in the GIS map passing through or contained in the area may be selected. A route from the departure point to the destination point may be computed using a dynamic planning algorithm and a subset of the map.

In an embodiment, the cells of the cellular network may be set as the grids. A cell-level path may be mapped onto a satellite map and be converted into an actual route as follows. The satellite map displaying the cell-level path may be delivered to a user. The user may select a route as instructed by the path according to an actual road condition reflected by the satellite map. In this way, a user may be provided with a road option unavailable in a GIS map, avoiding a problem of GIS map information lagging behind the actual road condition, as generally a newly-built road may not be updated to and displayed in the GIS map in at least three months.

With the route planning method for a navigation system according to the embodiments, route planning may be performed in two stages. First, an actual geographic space is divided into grids using cells of a cellular network. Then, trajectories of mobile stations may be extracted using records of inter-cell handovers of the mobile stations acquired from a mobile operator, such that information on trajectories of multiple real mobile stations may be sensed in real time. Path planning may be performed in a cell space of the cellular network, and then route matching may be performed based on a GIS map or a satellite map, which may lower dependence on the accuracy and timeliness of the GIS map, increasing real-time performance, accuracy, and effectiveness of a route planning result, as well as facilitating detecting an error in the GIS map, thereby providing an optimal path tolerant to a map fault. The method herein is based on a mobile communication network, thereby requiring but a low cost of deployment, leading to wide applicability.

According to an embodiment herein, a non-transitory computer-readable storage medium stores therein computer executable instructions for executing aforementioned route planning method for a navigation system herein.

Figure 4:
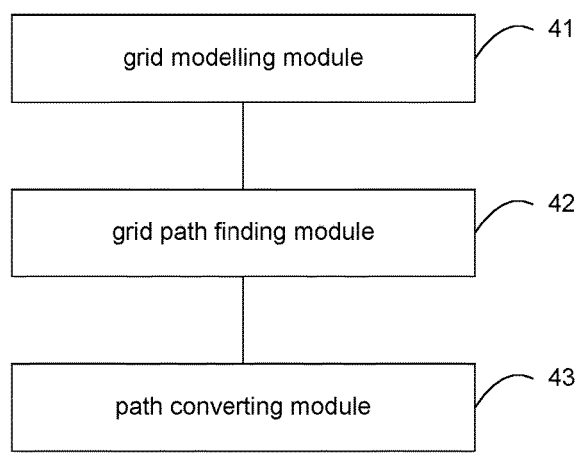
FIG. 4 is a diagram of a structure of a route planning device for a navigation system according to an embodiment herein.

FIG. 4 is a diagram of a structure of a route planning device for a navigation system according to an embodiment herein. As shown in FIG. 4, the route planning device includes a grid modelling module 41, a grid path finding module 42, and a path converting module 43.

The grid modelling module 41 is configured for: dividing an actual geographic space into grids, the grids being cells of a cellular network; acquiring a handover record of inter-cell handovers of mobile stations; and modelling an inter-cell adjacency according to the handover record.

The grid path finding module 42 is configured for: mapping a departure point and a destination point in the actual geographic space respectively to a departure grid and a destination grid; and determining, according to the modelled inter-cell adjacency, a grid-level path from the departure grid to the destination grid.

The path converting module 43 is configured for: converting the grid-level path into an actual route from the departure point to the destination point in the actual geographic space.

The grids may be the cells of the cellular network. Accordingly, the grid modelling module 41 in the route planning device may be further configured for: filtering the handover record according to a pre-set filtering solution.

The grid modelling module 41 may include:
a trajectory extracting sub-module configured for: extracting trajectories of the mobile stations according to the handover record;
a snapshot managing sub-module configured for: setting a set of all the trajectories within a period of time as a snapshot; and
a modelling sub-module configured for: modelling the inter-cell adjacency within the period of time according to the snapshot.

The modelling sub-module may be further configured for:
establishing, according to the snapshot, a weighted directed graph, with base stations of all the cells as vertices, inter-cell adjacencies as edges, and with an inter-cell adjacency index as a weight of an edge.

The inter-cell adjacency index may be a probability of transfer between two cells, or a duration needed for transfer between two cells.

The path converting module 43 may include:
a GIS map matching sub-module configured for: converting the grid-level path into an actual route from the departure point to the destination point in a GIS map; and/or
a satellite map matching sub-module configured for: converting the grid-level path into an actual route from the departure point to the destination point in a satellite map.

In a practical application, all the modules and the units may be implemented by a Central Processing Unit (CPU), a Micro Processing Unit (MPU), a Digital Signal Processor (DSP), or a Field-Programmable Gate Array (FPGA) located in the navigation system.

The device shown in FIG. 4 solves a problem in a way similar to the method. Refer to implementation of the method as described for that of the device herein, which will not be repeated.

Those skilled in the art will know that an embodiment herein may be provided as a method, system, or computer program product. Therefore, an embodiment herein may take on a form of hardware, software, or a combination thereof. In addition, an embodiment herein may take on a form of a computer program product implemented on one or more computer available storage media (including but not limited to, magnetic disk memory, optic memory, and the like) containing computer available program codes.

The present disclosure is illustrated with reference to flowcharts and/or block diagrams of the method, device (system) and computer-program product according to embodiments described herein. Note that each flow in the flowcharts and/or each block in the block diagrams as well as combination of flows in the flowcharts and/or blocks in the block diagrams may be implemented by instructions of a computer program. Such instructions may be offered in a processor of a general-purpose computer, a dedicated computer, an embedded processor or other programmable data processing devices to generate a machine, such that a device with a function specified in one or more flows of the flowcharts and/or one or more blocks in the block diagrams is produced by instructions executed by a processor of a computer or other programmable data processing devices.

These computer-program instructions may also be stored in a non-transitory computer-readable memory capable of guiding a computer or another programmable data processing device to work in a given way, such that the instructions stored in the computer-readable memory generate a manufactured good including an instruction device for implementing a function specified in one or more flows of the flowcharts and/or one or more blocks in the block diagrams.

These computer-program instructions may also be loaded in a computer or other programmable data processing devices, which thus executes a series of operations thereon to generate computer-implemented processing, such that the instructions executed on the computer or other programmable data processing devices provide the steps for implementing the function specified in one or more flows of the flowcharts or one or more blocks in the block diagrams.

What described are merely embodiments of the present disclosure, and are not intended to limit the scope of the present disclosure.

INDUSTRIAL APPLICABILITY

With a route planning method and device for a navigation system, as well as a non-transitory computer-readable storage medium according to embodiments herein, route planning may be performed in two stages. First, an actual geographic space is divided into grids using cells of a cellular network. Then, trajectories of mobile stations may be extracted using records of inter-cell handovers of the mobile stations acquired from a mobile operator, such that information on trajectories of multiple real mobile stations may be sensed in real time. Path planning may be performed in a cell space of the cellular network, and then route matching may be performed based on a GIS map or a satellite map, which may lower dependence on the accuracy and timeliness of the GIS map, increasing real-time performance, accuracy, and effectiveness of a route planning result, as well as facilitating detecting an error in the GIS map, thereby providing an optimal path tolerant to a map fault. The method herein is based on a mobile communication network, thereby requiring but a low cost of deployment, leading to wide applicability.

The invention claimed is:

1. A route planning method for a navigation system, comprising:
   acquiring a handover record of inter-cell handovers of mobile stations; and modelling an inter-cell adjacency according to the handover record, wherein an actual geographic space is divided into a grid of cells of a cellular network;
   mapping a departure point and a destination point in the actual geographic space respectively to a departure cell and a destination cell; and determining, according to the modelled inter-cell adjacency, a grid-level path from the departure cell to the destination cell; and
   converting the grid-level path into an actual route from the departure point to the destination point in the actual geographic space,
   wherein the acquiring a handover record of inter-cell handovers of mobile stations comprises:
      reading a file recording inter-cell handovers of mobile stations stored in a dedicated File Transfer Protocol (FTP) server by a signalling collecting platform of a mobile operator, and acquiring handover records from the file,
   wherein the method further comprises, before the modelling an inter-cell adjacency according to the handover record:
      filtering the handover record by at least one of:
         deleting a record related to a number of a mobile station with no mobility;
         retaining only records related to specific mobile station numbers; or
         deleting a handover record when a cell identifier in the handover record is not one of cell identifiers loaded in memory,
   wherein the modelling an inter-cell adjacency according to the handover record comprises:
      extracting trajectories of the mobile stations according to the handover record;
      setting a set of all the trajectories within a period of time as a snapshot; and
      modelling the inter-cell adjacency within the period of time according to the snapshot by:
         establishing, according to the snapshot, a weighted directed graph, with base stations of all the cells as vertices, inter-cell adjacencies as edges, and with an inter-cell adjacency index as a weight of an edge,
   wherein the inter-cell adjacency index is a probability of transfer between two cells, and
   wherein the probability is a number of records of transfer from a source cell to a target cell divided by a number of all records of transfer from the source cell.

2. The method according to claim 1, wherein the converting the grid-level path into an actual route from the departure point to the destination point in the actual geographic space comprises:
   converting the grid-level path into an actual route from the departure point to the destination point in a Geographic Information System (GIS) map; and/or
   converting the grid-level path into an actual route from the departure point to the destination point in a satellite map.

3. A route planning device for a navigation system, comprising:
   a processor; and
   memory storing instructions executable by the processor, wherein the processor
   is configured for performing a route planning method for a navigation system, the method comprising:
      acquiring a handover record of inter-cell handovers of mobile stations; and modelling an inter-cell adjacency according to the handover record, wherein an actual geographic space is divided into a grid of cells of a cellular network;
      mapping a departure point and a destination point in the actual geographic space respectively to a departure cell and a destination cell; and determining, according to the modelled inter-cell adjacency, a grid-level path from the departure cell to the destination cell; and
      converting the grid-level path into an actual route from the departure point to the destination point in the actual geographic space,
      wherein the acquiring a handover record of inter-cell handovers of mobile stations comprises:
         reading a file recording inter-cell handovers of mobile stations stored in a dedicated File Transfer Protocol (FTP) server by a signalling collecting platform of a mobile operator, and acquiring handover records from the file,
      wherein the method further comprises, before the modelling an inter-cell adjacency according to the handover record:
         filtering the handover record by at least one of:
            deleting a record related to a number of a mobile station with no mobility;
            retaining only records related to specific mobile station numbers; or
            deleting a handover record when a cell identifier in the handover record is not one of cell identifiers loaded in memory,
      wherein the modelling an inter-cell adjacency according to the handover record comprises:
         extracting trajectories of the mobile stations according to the handover record;
         setting a set of all the trajectories within a period of time as a snapshot; and
         modelling the inter-cell adjacency within the period of time according to the snapshot by:
            establishing, according to the snapshot, a weighted directed graph, with base stations of all the cells as vertices, inter-cell adjacencies as edges, and with an inter-cell adjacency index as a weight of an edge,
      wherein the inter-cell adjacency index is a probability of transfer between two cells, and
      wherein the probability is a number of records of transfer from a source cell to a target cell divided by a number of all records of transfer from the source cell.

4. The device according to claim 3, wherein the converting the grid-level path into an actual route from the departure point to the destination point in the actual geographic space comprises:
   converting the grid-level path into an actual route from the departure point to the destination point in a Geographic Information System (GIS) map; and/or
   converting the grid-level path into an actual route from the departure point to the destination point in a satellite map.

5. A non-transitory computer-readable storage medium, storing therein computer executable instructions for executing a route planning method for a navigation system, the method comprising:
  acquiring a handover record of inter-cell handovers of mobile stations; and modelling an inter-cell adjacency according to the handover record, wherein an actual geographic space is divided into a grid of cells of a cellular network;
  mapping a departure point and a destination point in the actual geographic space respectively to a departure cell and a destination cell; and determining, according to the modelled inter-cell adjacency, a grid-level path from the departure cell to the destination cell; and
  converting the grid-level path into an actual route from the departure point to the destination point in the actual geographic space,
  wherein the acquiring a handover record of inter-cell handovers of mobile stations comprises:
    reading a file recording inter-cell handovers of mobile stations stored in a dedicated File Transfer Protocol (FTP) server by a signalling collecting platform of a mobile operator, and acquiring handover records from the file,
  wherein the method further comprises, before the modelling an inter-cell adjacency according to the handover record:
    filtering the handover record by at least one of:
      deleting a record related to a number of a mobile station with no mobility;
      retaining only records related to specific mobile station numbers; or
      deleting a handover record when a cell identifier in the handover record is not one of cell identifiers loaded in memory,
  wherein the modelling an inter-cell adjacency according to the handover record comprises:
    extracting trajectories of the mobile stations according to the handover record;
    setting a set of all the trajectories within a period of time as a snapshot; and
    modelling the inter-cell adjacency within the period of time according to the snapshot by:
      establishing, according to the snapshot, a weighted directed graph, with base stations of all the cells as vertices, inter-cell adjacencies as edges, and with an inter-cell adjacency index as a weight of an edge,
  wherein the inter-cell adjacency index is a probability of transfer between two cells, and
  wherein the probability is a number of records of transfer from a source cell to a target cell divided by a number of all records of transfer from the source cell.

6. The non-transitory computer-readable storage medium according to claim 5, wherein the converting the grid-level path into an actual route from the departure point to the destination point in the actual geographic space comprises:
  converting the grid-level path into an actual route from the departure point to the destination point in a Geographic Information System (GIS) map; and/or
  converting the grid-level path into an actual route from the departure point to the destination point in a satellite map.

* * * * *